Oct. 1, 1957 W. E. FOSTER 2,808,018

CHANNEL INDICATORS FOR TELEVISION RECEIVERS

Filed Feb. 29, 1956 2 Sheets-Sheet 1

INVENTOR.
WALTER E. FOSTER
BY
Zugelter & Zugelter
Attys.

INVENTOR.
WALTER E. FOSTER
BY
Zugelter & Zugelter
Attys.

2,808,018
Patented Oct. 1, 1957

2,808,018

CHANNEL INDICATORS FOR TELEVISION RECEIVERS

Walter E. Foster, Bellevue, Ky., assignor to Avco Manufacturing Corporation, Cincinnati, Ohio, a corporation of Delaware Application February 29, 1956, Serial No. 568,473

2 Claims. (Cl. 116—124.4)

This invention relates to television receivers and more particularly to devices therefor that visually indicate the selected channel from the position in which the picture screen would normally be viewed.

The channels that can be selected on a television receiver are usually shown by numerals on the selector knob. The size and location of the knob and the numerals are such that one cannot determine what channel is turned on without leaving the normal viewing position and walking to the set.

An object of this invention is to provide a relatively small screen on the front of the television receiver on which the identification of the channel selected may be projected, and a mechanism including a light source that will show on the screen the channel number or designation that has been selected. Thus one is enabled to leisurely watch the picture all the while knowing what channel is on.

A further object is to provide a rotatable member having channel digits thereon and which is positioned in accordance with the position of the channel selector knob, and provided with a light source and a screen at the front of the set on which the channel digits of the rotatable member are projected and revealed to one viewing the picture tube from a vantage point.

Another object is to provide a channel indicator as in the preceding object for television receivers in which the selector knobs are on a side of the cabinet.

The above and other objects of the invention will be apparent to those of ordinary skill in the art to which the invention pertains from the following description taken in conjunction with the accompanying drawings.

Figures 1, 5, 6, 7, 8:
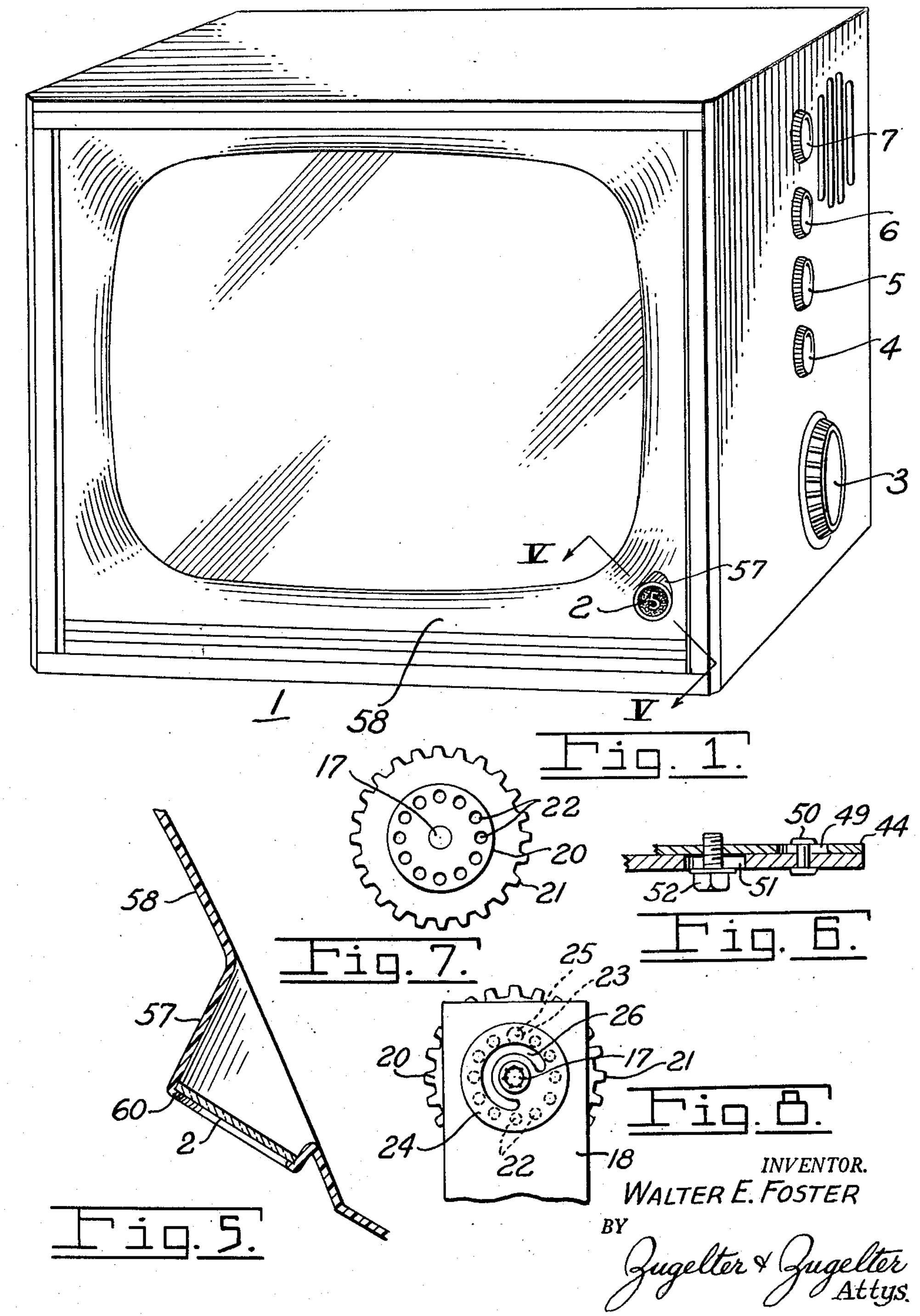
Figure 1 is a view in perspective of a television receiver provided with a channel indicator embodying a form of the invention.
Fig. 5 is a view in section taken on line V—V of Fig. 1 of a housing or boss containing a screen on which the selected channel is shown.
Fig. 6 is a view in section taken on line VI—VI of Fig. 3 of an adjustment for the light source for the channel indicator.

Fig. 7 is a view in front elevation of a sprocket embodied in the channel indicator, the sprocket being provided with sockets for receiving a locking member to arrest the sprocket in its various selected positions; and Fig. 8 is a partial view in front elevation of a support for the sprocket, and a yieldable member adapted to cooperate with the sockets on the sprocket and an arresting ball for releasably securing the sprocket and the rotatable member in its various selected positions.

In Fig. 1 of the drawings a television receiver 1 is shown having at the front thereof a channel indicating screen 2 on which the channel selected is visibly shown. The identification of the particular channel that has been turned on is visible to an observer occupying a position from which a television picture is normally viewed.

The particular television receiver illustrated is one in which the selector knob 3 and other adjustment knobs 4, 5, 6 and 7 are disposed on a side of the cabinet of the set. The knobs 4, 5, 6 and 7 are the ones by which the horizontal and vertical positioning of the picture may be adjusted and whereby brightness and contrast may be modified according to the viewer's preference.

Figures 2, 3, 4:
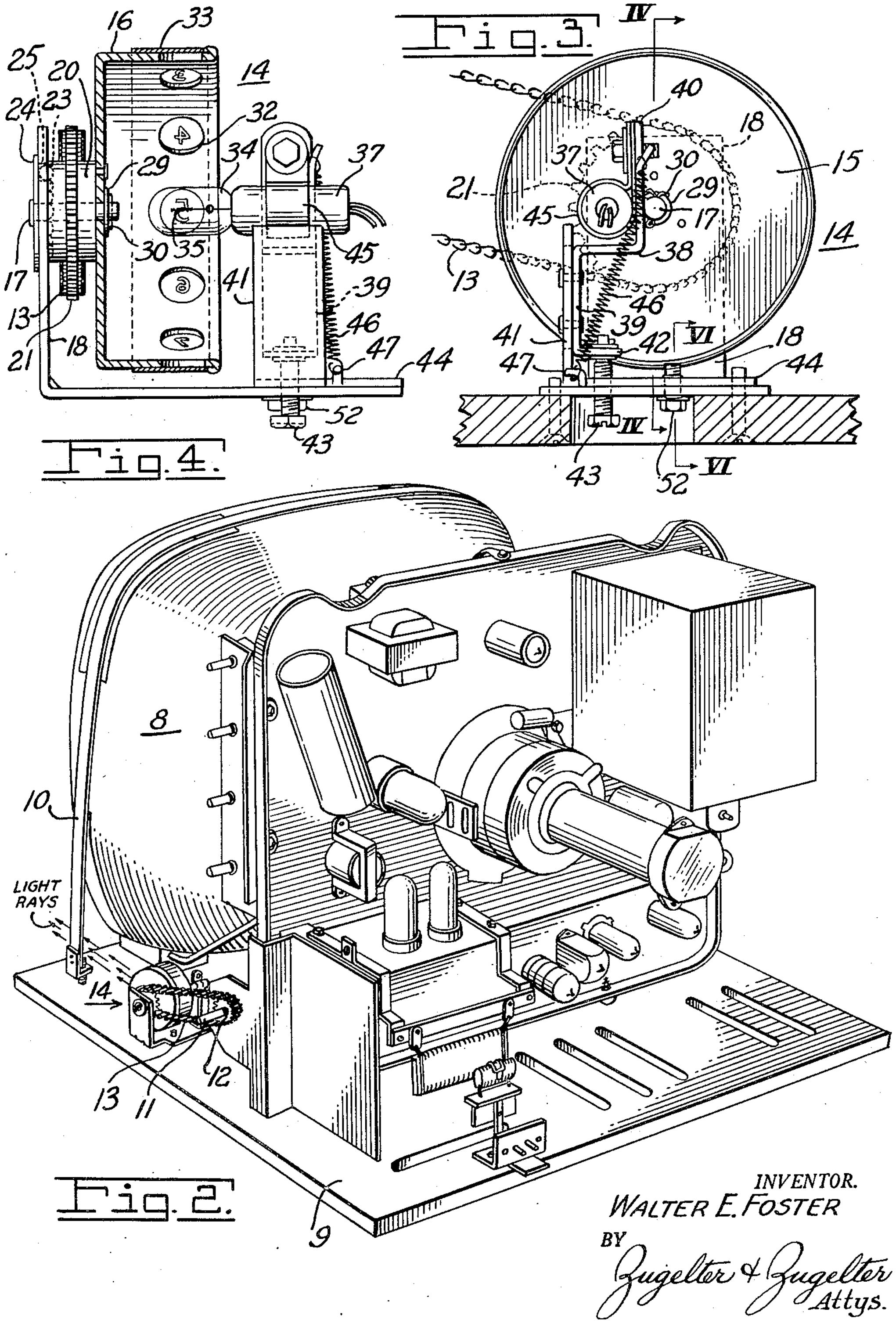
Fig. 2 is a view in perspective of the television receiver of Fig. 1 with the cabinet removed.
Fig. 3 is a view in side elevation of a portion of the device embodying the invention whereby the selected channel may be visually observed at the front of the set from a position where the picture is normally viewed.
Fig. 4 is a view in section of a part of the device shown in Fig. 3, the section being on line IV—IV of Fig. 3.

The mechanism whereby the channel identification is projected on screen 2 is shown more clearly in Figs. 2, 3 and 4. In Figure 2 the picture tube 8 and the other components that make up the circuit of the television set are shown mounted on a base 9. But as the various components of the circuit constitute no part of the invention, a description thereof is not necessary. A strap 10 passes over the top of the tube 8 and is fastened to the base as shown to hold the tube securely in position.

The channel selector knob 3 shown in Fig. 1 is mounted on a shaft 11 (see Fig. 2). The shaft 11 is provided with a sprocket 12 over which a transmission member such as a chain 13 is trained for operating mechanism 14 embodied in the device which projects the identification of the selected channel on screen 2.

As shown in Figs. 3 and 4 the mechanism 14 comprises a rotatable dial member 15 having an annular flange 16 disposed substantially parallel to a shaft 17 on which the member 15 is secured for rotation. The shaft 17 is supported by a bracket 18 of substantially right angle shape, secured to the base 9. On the shaft 17 is a sprocket member 20 having sprocket teeth 21 thereon over which the chain 13 is trained.

As shown in Fig. 7 the sprocket member 20 is provided with a plurality of uniformly spaced sockets 22, preferably of hemispherical shape. In practice the number of sockets 22 corresponds to the number of channels that can be selected by the selector knob 3. The sockets 22 cooperate with a ball 23 that is yieldably urged into a registering socket 22 by a resilient member 24, secured to the front of the vertical leg of the bracket 18. The ball 23 operates in an aperture 25 in the bracket 18 and is engageable by member 24. As shown, the member 24 is a spring-like disc having an arcuate slot 26 therein that is concentric with the shaft 17. The spring member 24 is secured at its center to the bracket 18 by the outer end of the shaft 17 which as shown has a flanged head thereon. Thus the portion of the member 24 to the left of the shaft 17 as seen in Fig. 8 deflects as the sprocket member 20 turns and the ball 23 moves in the aperture 25.

Shaft 11 is actuated by knob 3 in conventional fashion to select the desired channel in a step-type tuner.

As shown in Fig. 4 the rotatable member 15 is secured to the inner face of the sprocket member 20 and the sprocket and the member 15 are secured to shaft 17 by means of a washer 29 and retainer 30. The flange 16 of the rotatable member 15 is provided with a plurality of apertures 32 uniformly spaced about its periphery. The number of apertures correspond to the number of stations or channels that can be selected on the set. The apertures 32 have associated therewith station identification digits as indicated. The identification digits may be formed in the flange 16 or they may be formed on an opaque tape 33 cemented or otherwise secured to the outer periphery of flange 16. When an opaque tape is used, the channel identification digits may be formed by transparent areas in the tape, as shown.

Within the cup of the flange 16 is a light source such as a small bulb 34. The filament 35 of the bulb is horizontally disposed so that the light rays emitted thereby will be parallel. In order that the light rays may pass through the selected channel digit onto the screen 2 of Fig. 1, the bulb 34 must be properly aligned with the selected digit at all times. In order to provide for such alignment the bulb and its socket 37 are supported in a bracket 38 having a C-shaped portion 39 at its lower end and a vertical leg 40 at its upper end. The vertical leg of the C-shaped portion 39 is secured to a bracket 41 of substantially L-shape and that bracket in turn is mounted on the base leg of the bracket 18. The lowermost flange 42 of the bracket 38 is coupled to a screw 43 having threaded engagement with the base leg 44 of the bracket 41. By turning the screw 43 in one direction or the other, the bracket 38 with the light bulb and its socket may be adjusted vertically to the extent required to align the filament of the bulb with the channel identifying digits above mentioned. Also as shown, the upper leg 40 of the bracket 38 is provided with a clamp 45 by means of which the light bulb socket 37 may be secured in place. In order to eliminate backlash in the vertical adjustment of the light bulb 34, a spring 46 is provided. The spring is coupled to the vertical leg 40 of the bracket 38 and to a lug 47 on the base leg 44 of the bracket 41.

In order to provide for focusing the light source 34 on the screen 2 so as to make the channel digit appear as large as possible, the bracket 41 is provided with an elongated slot (shown in horizontal dashed outline in Fig. 3) through which the rivets extend. The base leg of the bracket 18 is provided with an elongated slot to accommodate a clamp screw 52 which is threaded into the base leg 44 of the bracket 41. By loosening the screw 52 the bracket 41 may be moved right or left as seen in Fig. 2 so that the light source bulb 34 may be moved towards or away from the digit nearest the screen 2. The bracket 18 is secured by means of screws (Fig. 2) to the base 9.

As shown in Fig. 2 the anchor strap 10 flares outwardly near the bottom in order to provide a space or channel between the tube and the strap through which the light rays may pass to the screen 2 without interference or obstruction. Also, as shown in Figs. 1 and 5 the screen 2 is mounted in a tubular boss 57 formed preferably as an integral part of the molding 58 that frames, so to speak, the screen of the picture tube. A convenient place to locate the boss 57 is in one of the corners, as in the lower right-hand corner. In that location it is nearest to the station or channel selector knob 3. In the outer end of the tubular boss 57 is a flange 60 to which the screen 2 is secured by cementing or other suitable means. The screen 2 may be made of plastic or glass which is translucent so that when one of the channel digits is projected on the screen the digit will appear as an illuminated area as indicated in Fig. 1, the remainder of the area of the screen being somewhat darker for contrast.

When the television set shown is in use it will be apparent from what has been described supra, that whenever the selector knob 3 is turned in one direction or another for the purpose of selecting a channel, the number of the particular channel selected will always appear on the screen 2. Thus a viewer may conveniently follow program schedules and ascertain from schedules and from the channel digit shown on the screen 2 whether he needs to change the position of the channel selector knob 3 in order to select a desired program.

While the invention has been shown in conjunction with a television receiving set having the selector knob and the other adjustment knobs on the side of the cabinet, it will be apparent to those skilled in the art that the invention is applicable to sets in which the selector knobs and the other adjustments may be on the top of the cabinet.

Having thus described the invention it will be apparent to those of ordinary skill in the art to which it pertains that various modifications and changes may be made in the illustrated embodiment without departing from either the spirit or the scope of the invention.

Therefore, what is claimed as new and desired to be secured by Letters Patent is:

1. A device for visually indicating to a viewer the selected channel of a television receiver, said receiver having a channel selector knob, said device comprising a shaft having a sprocket thereon and a member secured to the sprocket for rotation therewith, said member having an annular flange concentric with the shaft and provided with digital apertures corresponding to the number of the channels that can be selected, a support member for the shaft, said sprocket being adapted for rotation by a chain drive coupled to the station selector knob of the receiver, means associated with said shaft support member and sprocket for yieldingly and releasably securing the sprocket member in a selected channel position, a light source within said annular flange so positioned as to transmit light rays through the digital aperture corresponding to the channel selected, and means adapted to be located adjacent the screen of the picture tube and including a translucent screen aligned with the light rays emanating from the light source whereby the selected channel is visible on said screen to one occupying a viewing position.

2. A device for visually indicating to a viewer the selected channel of a television receiver, said receiver having a channel selector knob, said device comprising a shaft having a wheel thereon and a member secured to the wheel for rotation therewith, said member having an annular flange concentric with the shaft and provided with digital apertures corresponding to the number of the channels that can be selected, a support member for the shaft, said wheel being adapted for rotation by a drive coupled to the station selector knob of the receiver, means associated with said shaft support member and wheel for yieldingly and releasably securing the wheel in a selected channel position, a light source within said annular flange so positioned as to transmit light rays through the digital aperture corresponding to the channel selected, and means adapted to be located adjacent the screen of the picture tube and including a translucent screen aligned with the light rays emanating from the light source whereby the selected channel is visible on said screen to one occupying a viewing position.

References Cited in the file of this patent

UNITED STATES PATENTS

| | | |
|---|---|---|
| 2,641,160 | Mihalakis | June 9, 1953 |
| 2,681,634 | Polley | June 22, 1954 |
| 2,768,603 | Fisher | Oct. 30, 1956 |